United States Patent
Wu

(10) Patent No.: US 8,045,916 B2
(45) Date of Patent: Oct. 25, 2011

(54) SYSTEM OF SATELLITE SIGNAL DOWN CONVERSION AND RECEPTION USING A TIME DIVISION MULTIPLE ACCESS METHOD AND SIGNAL TRANSMISSION METHOD THEREOF

(75) Inventor: Chin Hsiang Wu, Hsinchu County (TW)

(73) Assignee: Microelectronics Technology Inc., Hsinchu (TW)

( * ) Notice: Subject to any disclaimer, the term of this patent is extended or adjusted under 35 U.S.C. 154(b) by 937 days.

(21) Appl. No.: 12/019,606

(22) Filed: Jan. 24, 2008

(65) Prior Publication Data

US 2008/0307465 A1    Dec. 11, 2008

(30) Foreign Application Priority Data

Jun. 7, 2007   (TW) .............................. 96120460 A

(51) Int. Cl.
*H04H 20/74*   (2008.01)
(52) U.S. Cl. ...................... 455/3.02; 455/3.05
(58) Field of Classification Search .......... None
See application file for complete search history.

(56) References Cited

U.S. PATENT DOCUMENTS

2008/0134279 A1 *  6/2008  Curtis et al. ............... 725/144

FOREIGN PATENT DOCUMENTS

| EP | 1134666 A2 | 9/2001 |
| WO | WO/2005/114879 | 12/2005 |
| WO | WO/2006/065747 A1 | 6/2006 |
| WO | WO/2007/040573 A1 | 4/2007 |

OTHER PUBLICATIONS

European Search report dated Nov. 23, 2009 for 08100905.2 which is a corresponding European application.
European Office Action dated Jun. 10, 2011 for 08100905.2, which is a corresponding European application.

* cited by examiner

*Primary Examiner* — Philip Sobutka
(74) *Attorney, Agent, or Firm* — WPAT, P.C.; Anthony King

(57) ABSTRACT

A system of satellite signal down conversion and reception comprises a low noise block down converter and a plurality of receivers. The low noise block down converter simultaneously and periodically sends a reference timing command to the plurality of receivers. Each of the plurality of receivers calibrates its timing based on the reference timing command to generate a plurality of data frames. Each of the data frames includes a plurality of time slots, and a time slot is designated to transmit data between the receiver and the low noise block down converter. Furthermore, each of the plurality of receivers uses a different time slot.

18 Claims, 3 Drawing Sheets

SYSTEM OF SATELLITE SIGNAL DOWN CONVERSION AND RECEPTION USING A TIME DIVISION MULTIPLE ACCESS METHOD AND SIGNAL TRANSMISSION METHOD THEREOF

(A) FIELD OF THE INVENTION

The present invention relates to a system of satellite signal down conversion and reception, and more particularly, to a system of satellite signal down conversion and reception using a time division multiple access (TDMA) method to avoid signal collision.

(B) DESCRIPTION OF THE RELATED ART

The main principle for a satellite antenna to receive satellite television transmission is that the satellite antenna collects weak satellite signals and the signals are directed to the low noise block down converter (LNB) mounted at the focal point of the dish antenna. Subsequently, the low noise block down converter amplifies the collected signals and down converts the radio frequency (RF) of their band to the 1 GHz-2 GHz intermediate frequency (IF), and then the converted signals are sent to an indoor receiver or set top box. The receiver selects from the signals of the channel that a user desires to watch, and then the original video and audio signals are restored by amplification and demodulation so that they can be input to a television for playback of a desired program.

FIG. 1 is a schematic diagram of a conventional satellite signal down conversion and reception system 10. After a dish antenna collects satellite signals, a down converter 11 amplifies signals and down converts their band to an intermediate frequency band. The down converter 11 transmits the processed signals to four receivers 141-144 by a coaxial cable 12 and four coaxial cables 161-164 respectively connected to the coaxial cable 12. Each of the receivers 141-144 is connected to one of televisions 81-84. Furthermore, the users of the televisions 81-84 can send request commands such as channel switches to the down converter 11 through the receivers 141-144. When two of the receivers 141 and 142 simultaneously send request commands 151 and 152 to the down converter 11, signal collision occurs between the commands 151 and 152. This will result in signal superimposition or signal distortion such that the down converter 11 cannot recognize these commands and the sources that the commands are sent from.

Even though a collision detection circuit can be added to the conventional satellite signal down conversion and reception system 10 or the transmission signals are delayed sequentially when a collision is detected so as to resolve the aforesaid problem, the cost of system hardware is increased and the operation speed of the receiver is reduced. Unfortunately, in some cases, such an operation even fails. In view of above, the market has an urgent need of a satellite signal down conversion and reception system capable of avoiding signal collisions.

SUMMARY OF THE INVENTION

The present invention provides a system of satellite signal down conversion and reception and signal transmission method thereof that employs a time division multiple access method to allow at least two receivers to simultaneously send request commands without signal collisions.

One aspect of the present invention provides a system of satellite signal down conversion and reception that simplifies user expansion processes. Thus, new users can apply to the system through designated time slots. The transmission protocol does not need to be modified even though the number of users is expended.

The present invention discloses a system of satellite signal down conversion and reception comprising a low noise block down converter and a plurality of receivers. The low noise block down converter simultaneously and periodically sends a reference timing command to the plurality of receivers. Each of the plurality of receivers calibrates its timing based on the reference timing command to generate a plurality of data frames. Each of the data frames includes a plurality of time slots, and a time slot is designated to transmit data between the receiver and the low noise block down converter. Furthermore, the plurality of receivers uses different time slots.

The present invention further discloses a signal transmission method for a system of satellite signal down conversion and reception. The method comprises the steps of sending a reference timing command from a low noise block down converter to a plurality of receivers; calibrating the timing of each of the receivers based on the reference timing command to generate a plurality of data frames, wherein each of the data frames includes a plurality of time slots and each of the plurality of receivers transmits and receives data to the low noise block down converter during a designated time slot.

DETAILED DESCRIPTION OF THE INVENTION

Figure 1:
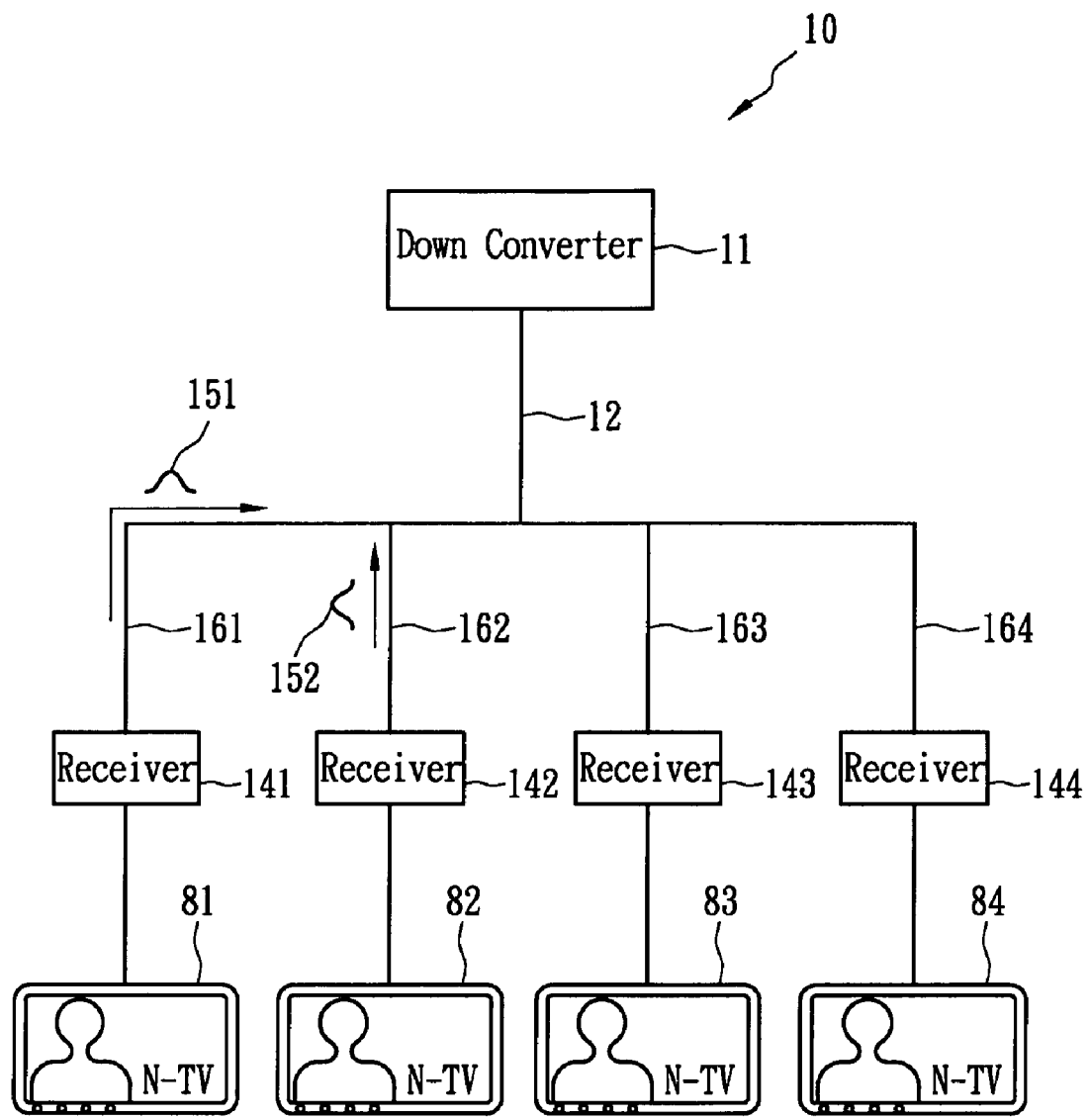
FIG. 1 is a schematic diagram illustrating a conventional system of satellite signal down conversion and reception.
Figure 2:
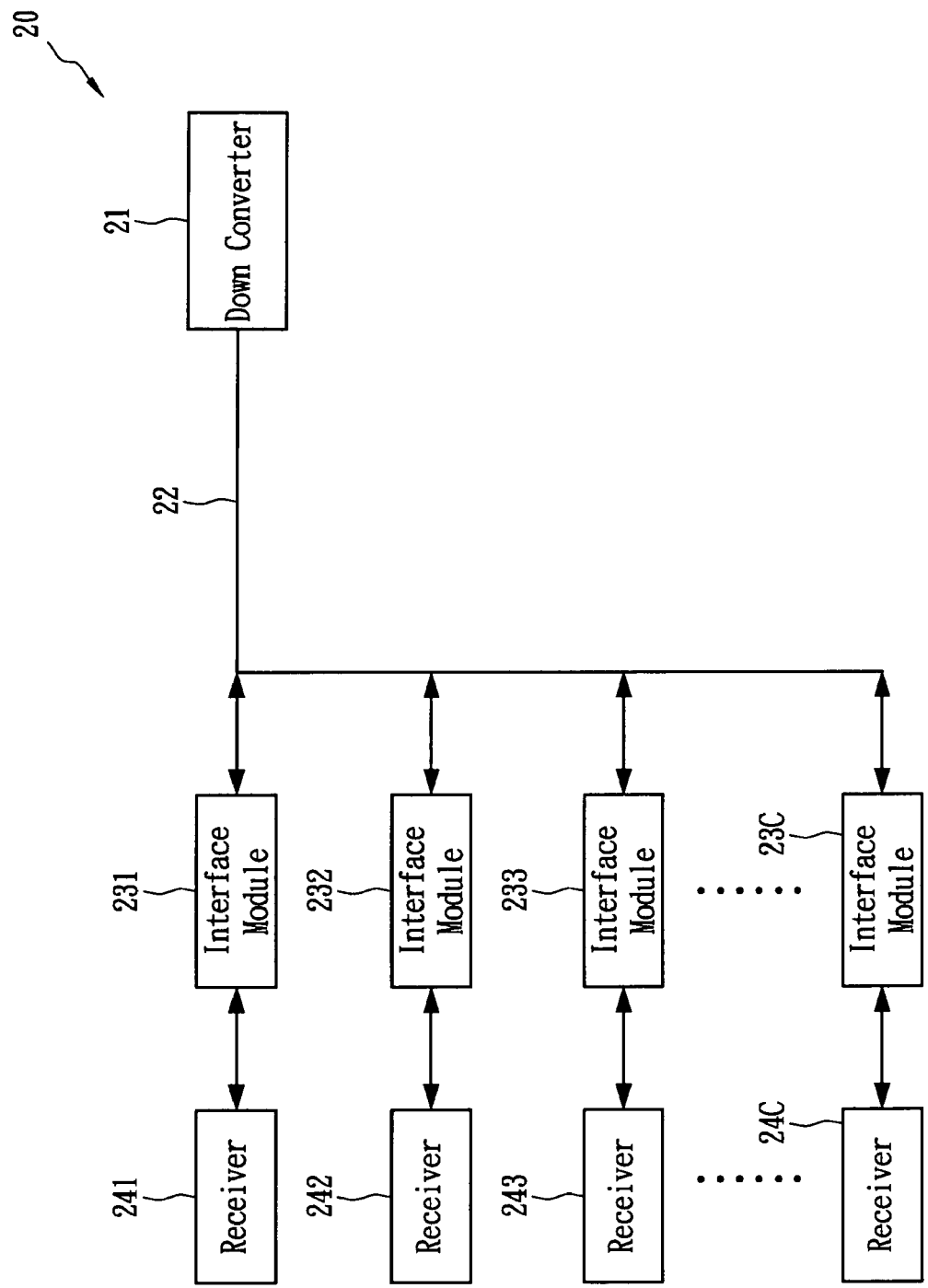
FIG. 2 is a schematic diagram illustrating a system of satellite signal down conversion and reception in accordance with an embodiment of the present invention.

FIG. 2 is a schematic diagram of the satellite signal down conversion and reception system of an embodiment of the present invention. A satellite signal down conversion and reception system 20 comprises a low noise block down converter 21 and a plurality of receivers 241-24C. Since the receivers 241-24C commonly employ the digital satellite equipment control (DiSEqC) protocol to transmit and receive signals, and the low noise block down converter 21 may use the full-duplex frequency shift keying (FSK) method to modulate the signals and receive signals in the FSK format, interface modules 231-23C are preferably capable of converting the DiSEqC format into the FSK format or from the FSK format into the DiSEqC format. Furthermore, the interface modules 231-23C can be respectively integrated into the receiver 241-24C, and, thus, the plurality of receivers 241-24C can transmit data through the transmission channels of a time division multiple access bus 22 to avoid signal collisions due to simultaneous request commands sent from the receivers 241-24C. The request command can include a serial number identified with a receiver for the low noise block down converter 21 to recognize which original receiver sent the request command. In this case, the low noise block down converter 21 can respond to a listener of the receivers 241-24C through a reception channel of the bus 22 so that signal collisions are unlikely to occur. However, the reply data of the low noise block down converter 21 is sent to all of the receivers 241-24C at the same time, therefore the serial number of a listening receiver substantially needs to be inserted into the reply data. This serial number can ensure each of the receivers 241-24C checks whether the reply data is sent to him. If the half-duplex frequency shift keying (FSK) method is adopted, since data transmission and reception (response from the low noise block down converter 21) both use the same channel, an additional time slot is necessary for the reference timing command of the low noise block down converter 21 and for the reply data. Alternatively, the time slot for the reply data and the designated time slot of the listened receiver can be the same to avoid signal collisions between the reply data and the request command simultaneously sent from any of the receivers 241-24C.

The low noise block down converter 21 has a counter that periodically and simultaneously sends a reference timing command to the receivers 241-24C. Each of the receivers 241-24C also has a timer for resetting to the same time reference after receiving the reference timing command, and generates a plurality of data frames based on the reference timing command. If a half-duplex frequency shift keying (FSK) method is used, then the low noise block down converter 21 responds to the receivers 241-24C through the plurality of data frames according to the reference timing.

Figure 3:
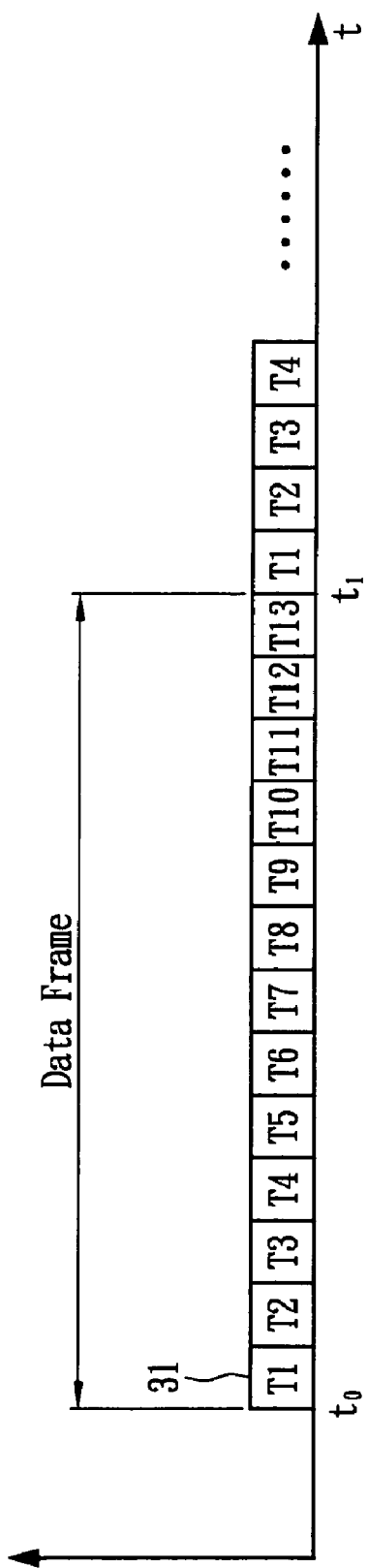
FIG. 3 is a configuration diagram illustrating a data frame transmitting in a time division multiple access bus in accordance with the present invention.

FIG. 3 is a configuration diagram illustrating a data frame transmitting in a time division multiple access bus in accordance with the present invention. Each data frame comprises a plurality of time slots (T1-T13) 31 and each of the receivers 241-24C transmits data to the low noise block down converter 21 through one of time slots T1-T12. Since each of the receivers 241-24C uses a different time slot, the problem of signal collisions can be effectively resolved. New users (or receivers) need to make requests to join the system through the time slot T13. That is, the low noise block down converter 21 can allow a request for a new user to join the system only through the time slot T13. However, since many new users may make requests to join the system at the same time, signal collisions still occur in such a special condition. In this case, when signal collisions occur in the time slot T13 due to several simultaneous newcomer requests, the low noise block down converter 21 cannot identify these input commands and fails to respond. These simultaneously requesting receivers wait for no reply data from the low noise block down converter 21 after a maximum time out, and then each of them respectively makes a new request to join the system according a different delay interval. The value of the different delay time can be randomly generated, but can be a multiple of the data frame.

Furthermore, a setting occupation check bit can be added to reply messages or timing commands of the low noise block down converter 21. In order to reduce signal collisions, before the new user makes a request to join the system, he needs to continuously check the reply message or timing command from the low noise block down converter 21 for recognizing whether the check bit is a representative value of apparatus non-occupation. If another new user is currently authorized and initialized by the low noise block down converter 21, the check bit will be set to a representative value of setting occupation by the low noise block down converter 21; otherwise, the check bit will be set to a representative value of apparatus non-occupation. In order to improve the collision detection capability of the low noise block down converter 21 between the requests of newcomers, error checking codes can be added to the commands sent from the receivers—Cyclic Redundancy Check Code (CRC) and Check Sum, for example. Therefore, errors in commands resulting from signal collision can be detected.

Figure 4:
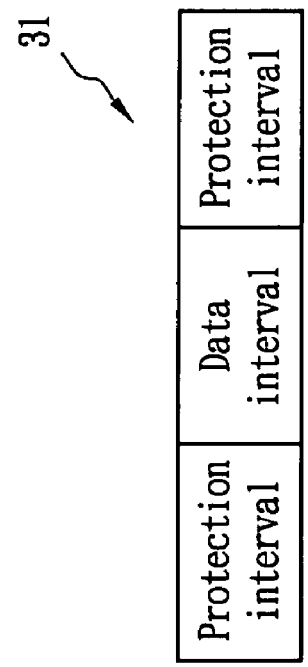
FIG. 4 is a configuration diagram illustrating a time slot in accordance with the present invention.

FIG. 4 is a configuration diagram of a time slot. A protection interval is disposed before and after each time slot in order to avoid delay of data transmission. The data interval is disposed between the two protection intervals so that the data interval in each time slot is distinct from other data intervals without overlapping with each other. The overlapped data interval cannot be correctly recognized.

The aforementioned descriptions of the present invention are intended to be illustrative only. Numerous alternative methods may be devised by persons skilled in the art without departing from the scope of the following claims.

What is claimed is:

1. A system of satellite signal down conversion and reception, comprising:
a plurality of receivers; and
a low noise block down converter simultaneously and periodically sending a reference timing command to the plurality of receivers, wherein each of the receivers calibrates its timing based on the reference timing command to generate a plurality of data frames and each of the data frames includes a plurality of time slots;
wherein each of the plurality of receivers transmits data or issues request commands, through a designated one of the plurality of time slots in transmission channels of a time division multiple access bus, to the low noise block down converter, the plurality of receivers respectively uses a different time slot, the low noise block down converter generates reply data in response to the request command, and the reply data comprises a setting occupation check bit.

2. The system of satellite signal down conversion and reception as claimed in claim 1, wherein one of the time slots of the data frame is designated as an interval for a new receiver to make a join request.

3. The system of satellite signal down conversion and reception as claimed in claim 1, further comprising a plurality of interface modules, wherein each of the plurality of receivers respectively connects to the low noise block down converter through the corresponding interface module.

4. The system of satellite signal down conversion and reception as claimed in claim 3, wherein the interface module can convert a signal with a frequency shift keying (FSK) format or a signal with a digital satellite equipment control (DiSEqC) format to the other.

5. The system of satellite signal down conversion and reception as claimed in claim 1, wherein the receiver is a digital set top box.

6. The system of satellite signal down conversion and reception as claimed in claim 1, wherein the request command comprises a serial number of the receiver issuing the request command.

7. The system of satellite signal down conversion and reception as claimed in claim 1, wherein the reply data comprises a serial number of the receiver issuing the request command.

8. The system of satellite signal down conversion and reception as claimed in claim 1, wherein the reply data from the low noise block down converter is received by a new receiver to confirm whether the setting occupation check bit is a representative value of apparatus non-occupation before the new receiver issues a join request command.

9. The system of satellite signal down conversion and reception as claimed in claim 1, wherein if the low noise block down converter cannot respond to a plurality of new receivers requesting to join the system during a default period after the plurality of new receivers simultaneously issue join request commands, each of the plurality of new receivers respectively makes a new join request command to join the system according a different delay interval.

10. A signal transmission method for a system of satellite signal down conversion and reception, comprising the steps of:
   simultaneously and periodically sending a reference timing command from a low noise block down converter to a plurality of receivers; and
   calibrating the reference timing of the plurality of receivers based on the reference timing command to generate a plurality of data frames, wherein each of the data frame comprises a plurality of time slots and each of the plurality of receivers transmits data to the low noise block down converter through a designated one of the plurality of time slots, and the timing command or a reply message sent from the low noise block down converter further comprises a setting occupation check bit.

11. The signal transmission method for a system of satellite signal down conversion and reception as claimed in claim 10, wherein the plurality of receivers respectively uses different time slots.

12. The signal transmission method for a system of satellite signal down conversion and reception as claimed in claim 10, wherein one of the time slots as an initial setting slot is designated as an interval for a new receiver to make a join request.

13. The signal transmission method for a system of satellite signal down conversion and reception as claimed in claim 12, further comprising a step of:
   sending a new join request command from each of the plurality of new receivers respectively to join the system according a different delay interval when the low noise block down converter cannot respond to a plurality of new receivers requesting to join the system during a default period after the plurality of new receivers simultaneously issue the join request commands through the initial setting slot.

14. The signal transmission method for a system of satellite signal down conversion and reception as claimed in claim 13, wherein the delay interval is randomly generated and is a multiple of the data frame.

15. The signal transmission method for a system of satellite signal down conversion and reception as claimed in claim 14, further comprising the steps of:
   confirming the setting occupation check bit by a new receiver;
   continuously receiving the reply message from the low noise block down converter or the timing command by the new receiver when the setting occupation check bit shows a value representing occupation; and
   issuing the join request until the setting occupation check bit is changed into another value representing non-occupation.

16. The signal transmission method for a system of satellite signal down conversion and reception as claimed in claim 10, wherein each of the time slots comprises one or two protection intervals, and at least one data interval is placed before or after the protection interval or placed between the two protection intervals.

17. The signal transmission method for the system of satellite signal down conversion and reception as claimed in claim 10, wherein the data frame further comprises a time slot for carrying the reference timing command and reply data of the low noise block down converter when the low noise block down converter uses a half-duplex frequency shift keying (FSK) method to transmit and reply data.

18. The signal transmission method for a system of satellite signal down conversion and reception as claimed in claim 17, wherein the reply data of the low noise block down converter uses the same time slot that the receiver receiving the reply data uses to avoid signal collisions between the simultaneous request commands from the plurality of receivers and the reply data.

* * * * *